United States Patent
Gurvich et al.

(10) Patent No.: US 12,480,425 B2
(45) Date of Patent: Nov. 25, 2025

(54) ROTOR CONTAINMENT STRUCTURE

(71) Applicant: Hamilton Sundstrand Corporation, Charlotte, NC (US)

(72) Inventors: Mark R. Gurvich, Middletown, CT (US); Viktor Kilchyk, Lancaster, NY (US); Christopher Simpson, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/424,084

(22) Filed: Jan. 26, 2024

(65) Prior Publication Data
US 2025/0243784 A1 Jul. 31, 2025

(51) Int. Cl.
*F01D 25/24* (2006.01)

(52) U.S. Cl.
CPC .......... *F01D 25/24* (2013.01); *F05D 2240/14* (2013.01); *F05D 2300/603* (2013.01)

(58) Field of Classification Search
CPC ...... F01D 25/24; F01D 25/243; F01D 25/005; F01D 21/045; F05D 2240/14; F05D 2300/603; B29C 70/86; B29C 70/207; B29C 70/222
See application file for complete search history.

(56) References Cited

U.S. PATENT DOCUMENTS

| | | |
|---|---|---|
| 7,390,161 B2 | 6/2008 | Xie et al. |
| 8,440,276 B2 | 5/2013 | Rose et al. |
| 8,883,660 B2 | 11/2014 | Goering |
| 9,903,228 B2 | 2/2018 | Durie et al. |
| 9,988,156 B2 | 6/2018 | Tanaka et al. |
| 10,077,678 B2 | 9/2018 | Hannecart |
| 10,428,681 B2 | 10/2019 | Finlayson et al. |
| 10,786,954 B2 | 9/2020 | Jalowka et al. |
| 2008/0304960 A1 | 12/2008 | Cvjeticanin et al. |
| 2020/0157968 A1 | 5/2020 | Braun et al. |
| 2022/0307388 A1* | 9/2022 | Kray .................. F01D 25/24 |
| 2023/0243274 A1 | 8/2023 | Kilchyk et al. |

FOREIGN PATENT DOCUMENTS

| | | | |
|---|---|---|---|
| EP | 1783343 A2 | 5/2007 | |
| EP | 4219953 A1 | 8/2023 | |
| WO | WO-2010128153 A1 * | 11/2010 | ............ B23P 15/006 |

OTHER PUBLICATIONS

Search Report issued in European Patent Application No. 25153650.4; Date of Mailing Jun. 3, 2025 (7 pages).

* cited by examiner

*Primary Examiner* — Nathaniel E Wiehe
*Assistant Examiner* — Maxime M Adjagbe
(74) *Attorney, Agent, or Firm* — CANTOR COLBURN LLP (57) ABSTRACT

A shroud reinforcement is provided for a shroud that is coaxial with and partially surrounds a rotor and that includes tubular and flange sections and a transition section axially interposed between the tubular and flange sections. The shroud reinforcement includes first fiber-reinforced polymer-matrix composite reinforcement elements with fibers extending along an axial dimension of the rotor and being disposed to reinforce the transition section and second fiber-reinforced polymer-matrix composite reinforcement elements with fibers extending along a circumferential dimension of the rotor and being disposed to reinforce the transition section.

20 Claims, 8 Drawing Sheets

ROTOR CONTAINMENT STRUCTURE

BACKGROUND

The present disclosure relates to rotor containment in a rotary machine and, more particularly, to a shroud with shroud reinforcement around a rotor.

Containment refers to a first component confining a second component within a machine if the second component mechanically fails. Containment is necessary in rotary machines on aircraft because many devices and people are fit into a small space. Should a rotating component break, high centrifugal forces acting on that component could send the component into other devices, structures or passengers on the aircraft.

Containment for a rotating component can be typically a relatively heavy part due to requirements to contain high-speed impact events with high reliability. However, aircraft and systems on the aircraft are more efficient when the aircraft is lighter. Thus, high strength-to-weight ratio materials, such as fiber-reinforced composites, can be used for containment in axial fans to satisfy a dilemma of low weight from one side and reliable resistance to the impact behavior, on the other hand.

BRIEF DESCRIPTION

According to an aspect of the disclosure, a shroud reinforcement is provided for a shroud that is coaxial with and partially surrounds a rotor and that includes tubular and flange sections and a transition section axially interposed between the tubular and flange sections. The shroud reinforcement includes first fiber-reinforced polymer-matrix composite reinforcement elements with fibers extending along an axial dimension of the rotor and being disposed to reinforce the transition section and second fiber-reinforced polymer-matrix composite reinforcement elements with fibers extending along a circumferential dimension of the rotor and being disposed to reinforce the transition section.

In accordance with additional or alternative embodiments, at least one of the first fiber-reinforced polymer-matrix composite reinforcement elements extend along a full axial length of the transition section and do not overlap with one another, the first fiber-reinforced polymer-matrix composite reinforcement elements extend along the full axial length of the transition section and partially overlap with one another and the first fiber-reinforced polymer-matrix composite reinforcement elements extend along the full axial length of the transition section and partially overlap with one another and include additional first fiber-reinforced polymer-matrix composite reinforcement elements that extend along a partial axial length of the transition section.

In accordance with additional or alternative embodiments, the first fiber-reinforced polymer-matrix composite reinforcement elements abut with an external surface of the transition section, the shroud includes an additional part surrounding the transition section and the first fiber-reinforced polymer-matrix composite reinforcement elements and defines treads on which the second fiber-reinforced polymer-matrix composite reinforcement elements are seated and the treads are at least one of flat cylindrical steps, linearly self-locking cylindrical steps, convex self-locking cylindrical steps and concave self-locking cylindrical steps.

In accordance with additional or alternative embodiments, the first fiber-reinforced polymer-matrix composite reinforcement elements abut with an external surface of the transition section, the shroud includes an additional part surrounded by the transition section and the first fiber-reinforced polymer-matrix composite reinforcement elements and defines treads on which the second fiber-reinforced polymer-matrix composite reinforcement elements are seated and the treads are at least one of flat cylindrical steps, linearly self-locking cylindrical steps, convex self-locking cylindrical steps and concave self-locking cylindrical steps.

In accordance with additional or alternative embodiments, the first and second composite reinforcement elements include thermoset polymers or thermoplastic polymers reinforced by one or more of organic fibers, carbon fibers and glass fibers.

According to an aspect of the disclosure, a rotor assembly is provided and includes a shroud coaxial with and partially surrounding a rotor and including tubular and flange sections and a transition section axially interposed between the tubular and flange sections and shroud reinforcement. The shroud reinforcement includes first fiber-reinforced polymer-matrix composite reinforcement elements extending along an axial dimension of the rotor and being disposed to reinforce the transition section and second fiber-reinforced polymer-matrix composite reinforcement elements extending along a circumferential dimension of the rotor and being disposed to reinforce the transition section.

In accordance with additional or alternative embodiments, at least one of the first fiber-reinforced polymer-matrix composite reinforcement elements extend along a full axial length of the transition section and do not overlap with one another, the first fiber-reinforced polymer-matrix composite reinforcement elements extend along the full axial length of the transition section and partially overlap with one another and the first fiber-reinforced polymer-matrix composite reinforcement elements extend along the full axial length of the transition section and partially overlap with one another and comprise additional first fiber-reinforced polymer-matrix composite reinforcement elements that extend along a partial axial length of the transition section.

In accordance with additional or alternative embodiments, the first fiber-reinforced polymer-matrix composite reinforcement elements abut with an external surface of the transition section and the shroud includes an additional part surrounding the transition section and the first fiber-reinforced polymer-matrix composite reinforcement elements and defines treads on which the second fiber-reinforced polymer-matrix composite reinforcement elements are seated.

In accordance with additional or alternative embodiments, the treads are at least one of flat cylindrical steps, linearly self-locking cylindrical steps, convex self-locking cylindrical steps and concave self-locking cylindrical steps.

In accordance with additional or alternative embodiments, the first fiber-reinforced polymer-matrix composite reinforcement elements abut with an external surface of the transition section and the shroud includes an additional part surrounded by the transition section and the first fiber-reinforced polymer-matrix composite reinforcement elements and defines treads on which the second fiber-reinforced polymer-matrix composite reinforcement elements are seated.

In accordance with additional or alternative embodiments, the treads are at least one of flat cylindrical steps, linearly self-locking cylindrical steps, convex self-locking cylindrical steps and concave self-locking cylindrical steps.

In accordance with additional or alternative embodiments, the shroud includes one or more of metallic or alloy materials, polymers and reinforced polymers.

In accordance with additional or alternative embodiments, the first and second fiber-reinforced polymer-matrix composite reinforcement elements include thermoset polymers or thermoplastic polymers reinforced by one or more of organic fibers, carbon fibers and glass fibers.

According to an aspect of the disclosure, a method of assembling a shroud for a rotor assembly is provided and includes forming a shroud to be coaxial with and partially surround a rotor and including tubular and flange sections and a transition section axially interposed between the tubular and flange sections and forming shroud reinforcement. The forming of the shroud reinforcement includes arranging first fiber-reinforced polymer-matrix composite reinforcement elements to extend along an axial dimension of the rotor and to be disposed to reinforce the transition section and arranging second fiber-reinforced polymer-matrix composite reinforcement elements to extend along a circumferential dimension of the rotor and to be disposed to reinforce the transition section.

In accordance with additional or alternative embodiments, the shroud includes one or more of metallic or alloy materials, polymers and reinforced polymers, the first and second composite reinforcement elements include thermoset polymers or thermoplastic polymers reinforced by one or more of organic fibers, carbon fibers and glass fibers and the method further includes one or more of curing the thermoset polymers, solidifying the thermoplastic polymers and adhering the thermoset polymers or the thermoplastic polymers.

In accordance with additional or alternative embodiments, the arranging of the first fiber-reinforced polymer-matrix composite reinforcement elements includes at least one of arranging the first fiber-reinforced polymer-matrix composite reinforcement elements to extend along a full axial length of the transition section and not to overlap with one another, arranging the first fiber-reinforced polymer-matrix composite reinforcement elements to extend along the full axial length of the transition section and to partially overlap with one another, and arranging the first fiber-reinforced polymer-matrix composite reinforcement elements to extend along the full axial length of the transition section and to partially overlap with one another and to include additional first fiber-reinforced polymer-matrix composite reinforcement elements that extend along a partial axial length of the transition section.

In accordance with additional or alternative embodiments, the arranging of the first fiber-reinforced polymer-matrix composite reinforcement elements is executed such that the first fiber-reinforced polymer-matrix composite reinforcement elements abut with an external surface of the transition section, the method further includes surrounding the transition section with an additional part defining treads and the arranging of the second fiber-reinforced polymer-matrix composite reinforcement elements includes seating the second fiber-reinforced polymer-matrix composite reinforcement elements on the treads.

In accordance with additional or alternative embodiments, the treads are at least one of flat cylindrical steps, linearly self-locking cylindrical steps, convex self-locking cylindrical steps and concave self-locking cylindrical steps.

In accordance with additional or alternative embodiments, the arranging of the first fiber-reinforced polymer-matrix composite reinforcement elements includes arranging the first fiber-reinforced polymer-matrix composite reinforcement elements such that the first fiber-reinforced polymer-matrix composite reinforcement elements abut with an external surface of the transition section and the method further includes surrounding an additional part by the transition section and the first fiber-reinforced polymer-matrix composite reinforcement elements, the additional part defining treads on which the second fiber-reinforced polymer-matrix composite reinforcement elements are seated.

In accordance with additional or alternative embodiments, the treads are at least one of flat cylindrical steps, linearly self-locking cylindrical steps, convex self-locking cylindrical steps and concave self-locking cylindrical steps.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIGS. 3B1, 3B2, 3B3 and 3B4 are schematic through-thickness views of layers of the shroud, the orthogonal first and second composite reinforcement elements and an external part of the rotor assembly of FIG. 3A in accordance with embodiments;

DETAILED DESCRIPTION

Figure 1:
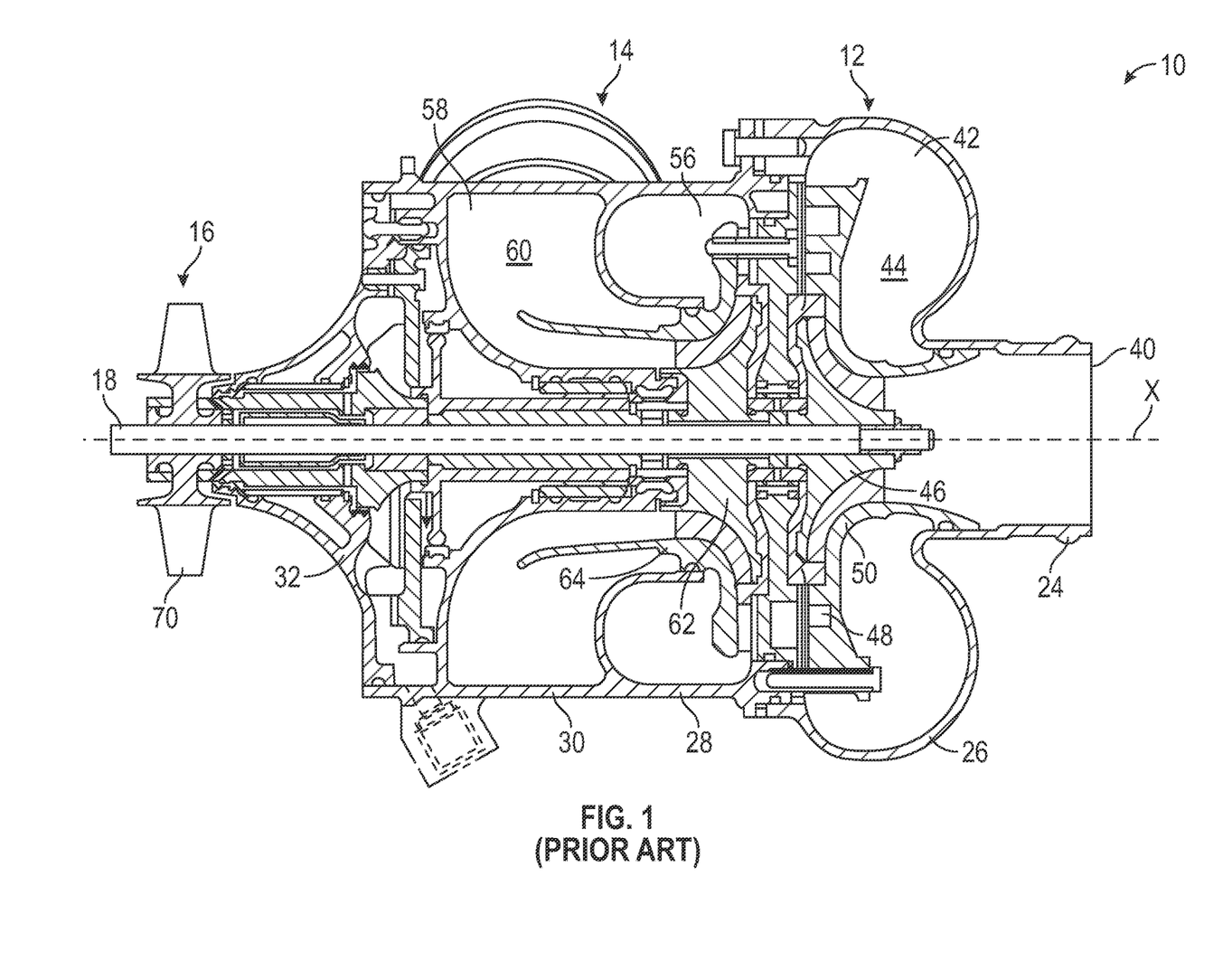
FIG. 1 is an axial cross-sectional view of a prior art rotary machine.

With reference to FIG. 1, a typical air cycle machine 10 is provided. The air cycle machine 10 is rotatable about central axis X and includes compressor section 12, turbine section 14, fan section 16 and shaft 18. The compressor section 12 includes compressor inlet housing 24 and compressor duct housing 26. The turbine section 14 includes turbine inlet housing 28 and turbine duct housing 30. The fan section 16 includes fan housing 32. The compressor section 12 also includes compressor inlet 40, compressor outlet 42, compressor duct 44, compressor rotor 46, diffuser 48 and compressor shroud 50. The turbine section 14 also includes turbine inlet 56, turbine outlet 58, turbine duct 60, turbine rotor 62 and turbine shroud 64. The fan section 16 also includes blades 70.

In the air cycle machine 10, the compressor section 12, the turbine section 14 and the fan section 16 are all mounted on shaft 18. The shaft 18 rotates around the central axis X. The compressor inlet housing 24 and the compressor duct housing 26 are each disposed to form a housing for the compressor section 12. The compressor inlet housing 24 and the compressor duct housing 26 can be an integral piece with the compressor inlet housing 24 connected to a first side of the compressor duct housing 26. The turbine inlet housing 28 and the turbine duct housing 30 can be an integral housing for the turbine section 14. The turbine inlet housing 28 can connect to a second side of the compressor duct housing 26 and the fan housing 32 can connect to the turbine duct housing 30 on a side opposite the turbine inlet housing 28. The fan housing 32 can be a housing for the fan section 16.

The compressor section 12 includes the compressor inlet 40, the compressor outlet 42, the compressor duct 44, the compressor rotor 46, the diffuser 48 and the compressor shroud 50. The compressor inlet 40 is an opening in compressor inlet housing 24. Compressor outlet 42 is an opening in compressor duct housing 26. Compressor duct 44 fluidly connects compressor inlet 40 with compressor outlet 42. Compressor rotor 46 is within compressor duct 44 and mechanically connected to shaft 18. Diffuser 48 is within compressor duct 44 and located radially outward from compressor rotor 46. A first portion of compressor shroud 50 connects to a radially inner surface of compressor inlet housing 24. A second portion of compressor shroud 50 connects to diffuser 48. Compressor shroud 50 partially surrounds compressor rotor 46.

The turbine section 14 includes the turbine inlet 56, the turbine outlet 58, the turbine duct 60, the turbine rotor 62 and the turbine shroud 64. The turbine inlet 56 forms an opening into the turbine inlet housing 28. The turbine outlet 58 forms an opening in the turbine duct housing 30. The turbine duct 60 fluidly connects the turbine inlet 56 with the turbine outlet 58. The turbine rotor 62 is within the turbine duct 60. The turbine rotor 62 mechanically connects to the shaft 18. The turbine shroud 64 connects to the turbine inlet housing 28. The turbine shroud 64 is disposed radially outwardly from and partially surrounds the turbine rotor 62. The turbine shroud 64 includes a turbine nozzle disposed toward a downstream portion thereof.

The fan section 16 includes fan blades 70. The fan blades 70 are each mounted on and rotate with the shaft 18. The fan section 16 draws in ram air from a ram air scoop or, alternatively, from an associated gas turbine or other aircraft component. The fan section 16 may also be used to draw air through a heat exchanger.

Air is received in the air cycle machine 10 at the compressor inlet 40. Air sources can include ram air, an associated gas turbine engine or another aircraft component. The air passes through the compressor section 12 where the air is compressed with the compressor rotor 46 and the diffuser 48. The compressor outlet 42 discharges the compressed air from the compressor section 12. The discharged compressed air can then pass through a heat exchanger and be used for other processes on an aircraft. The compressor shroud 50 provides containment in case of a catastrophic failure of the compressor rotor 46.

The compressed air can be routed into the turbine inlet 56 from the heat exchanger or other places where the compressed air is necessary in an aircraft. The compressed air expands and drives the turbine rotor 62 while passing through the turbine section 14. The turbine nozzle on the turbine shroud 64 helps decrease the pressure of air moving through the turbine shroud 64. The air is discharged out of the turbine outlet 58 and can then be routed to other parts of the aircraft, for example, for use as cabin air. The turbine shroud 64 provides containment in case of a catastrophic failure of the turbine rotor 62.

The compressor shroud 50 and the turbine shroud 64 provide containment for the compressor rotor 46 and the turbine rotor 62, respectively. Containment refers to the ability of a first component to confine a second component upon the second component mechanically failing and is necessary to protect passengers and other aircraft systems from projectile rotary machine components and to comply with aircraft safety regulations. The amount of containment necessary is measured in grams of material. A heavier rotor requires more grams of containment. However, increasing the weight of containment on the compressor shroud 50 and the turbine shroud 64 make the air cycle machine 10 heavier overall and less ideal for use in aircraft.

Figure 2:
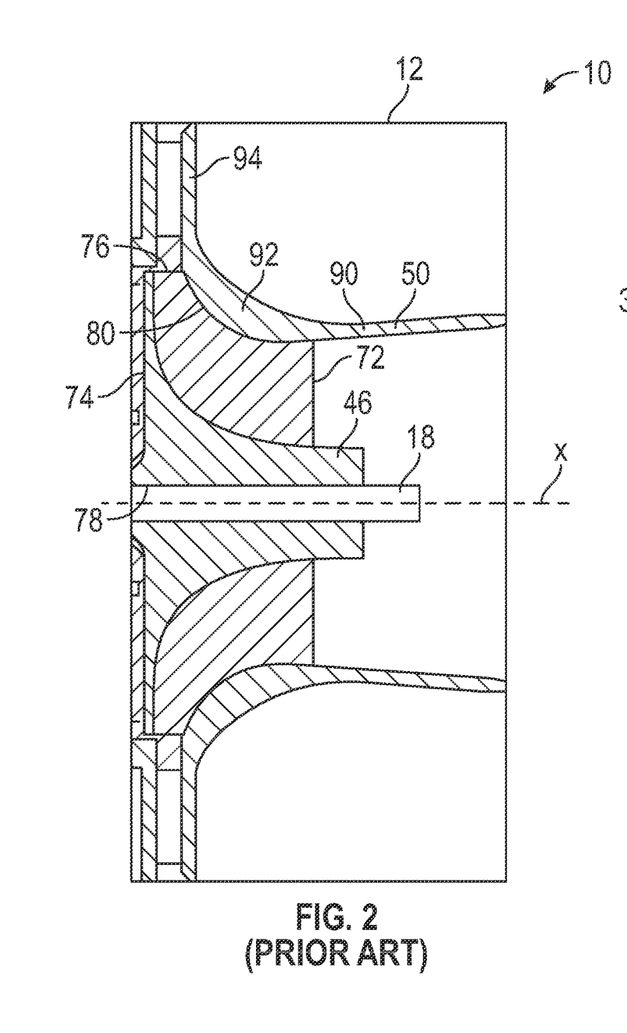
FIG. 2 is an axial cross-sectional view of a portion of the prior art rotary machine of FIG. 1.

With continued reference to FIG. 1 and with additional reference to FIG. 2, the compressor rotor 46 includes first side 72, second side 74, radially outer side 76, bore 78 and curved side 80 and the compressor shroud 50 includes tubular section 90, transition section 92 and flange section 94. The first side 72 is oriented toward the right side of FIG. 2 and the second side 74 is opposite the first side 72. The radially outer side 76 is radially away from the central axis X and the bore 78 is opposite the radially outer side 76. The bore 78 ties the compressor rotor 46 to the shaft 18. The curved side 80 is interposed between the first side 72 and the radially outer side 76. The tubular section 90 extends axially past the first side 72 and a first end of the transition section 92 connects to the tubular section 90. The transition section 92 is a curved section of the compressor shroud 50 and is adjacent to the curved side 80. The transition section 92 can be thickened to include more metal (i.e., aluminum) or alloy to provide containment for the compressor rotor 46. The flange section 94 connects to a second end of the transition section 9 and extends radially past outer side 76.

The thickening of the transition section 92 provides containment for the compressor rotor 46. The turbine shroud 64 similarly has a thickened transition section that provides containment for the turbine rotor 62. As noted above, the containment is necessary because rotors, like the compressor rotor 46 and the turbine rotor 62, are subject to high centrifugal forces during operations thereof and containment protects passengers and other aircraft systems from projectile rotary machine components should the compressor rotor 46 or the turbine rotor 62 mechanically fail as well as to comply with aircraft safety regulations. The amount of containment necessary for a component like the compressor rotor 46 or the turbine rotor 62 is measured in grams of material. While a heavier rotor requires more grams of containment, increasing the weight of containment make the air cycle machine 10 heavier overall and less ideal for use in aircraft.

The air cycle machine 10 also heats when operating. Air entering the air cycle machine 10 from a turbine engine is warm and gets warmer as it is compressed, so the compressor section 12 heats as the air cycle machine 10 operates. Further, air cools when moving through the turbine section 14 and residual heat is transferred to components in the turbine section 14. As the air cycle machine 10 operates and heats, components within it radially and axially expand.

Thus, as will be described below, a light-weight composite case or shroud is provided for use with aircraft air management systems (AMS), e.g., air compressor rotors. The light-weight composite shroud includes composite reinforcements independently placed in two orthogonal directions (i.e., with fiber orientations in axial and hoop or circumferential dimensions.

Figure 3A:
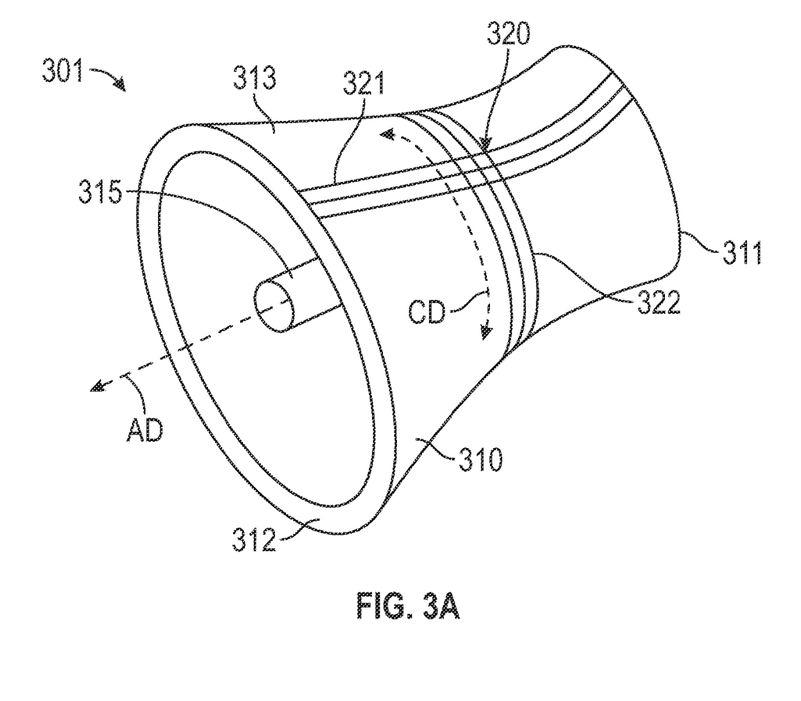
FIG. 3A is a perspective view of a rotor assembly with a shroud and orthogonal first and second composite reinforcement elements in accordance with embodiments.
Figure 3B:
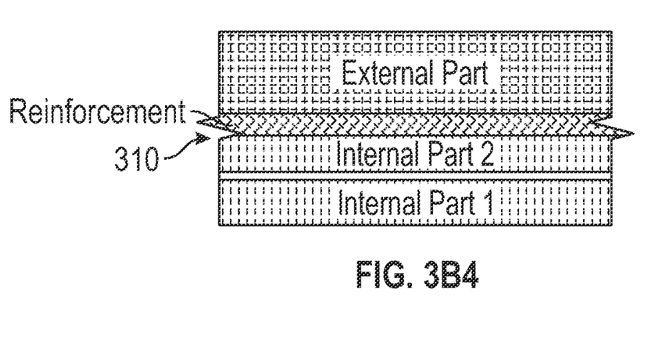
Figure 3B:
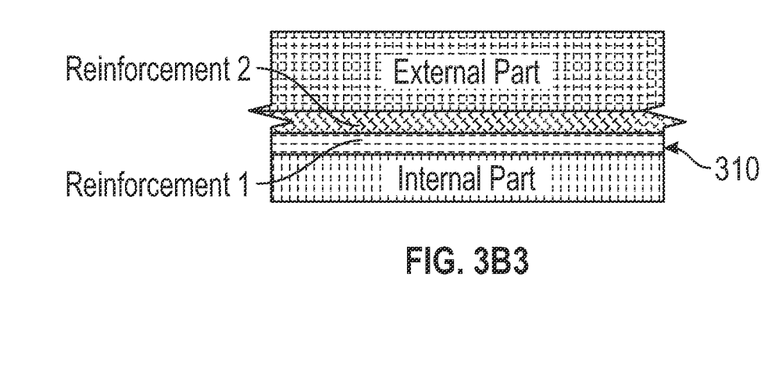
Figures 3B, 3B:
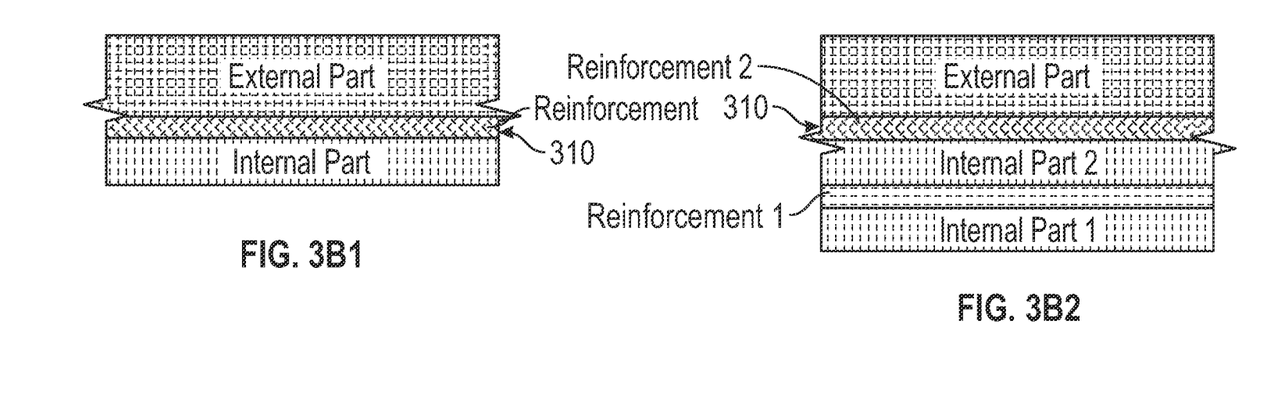
Figure 4:
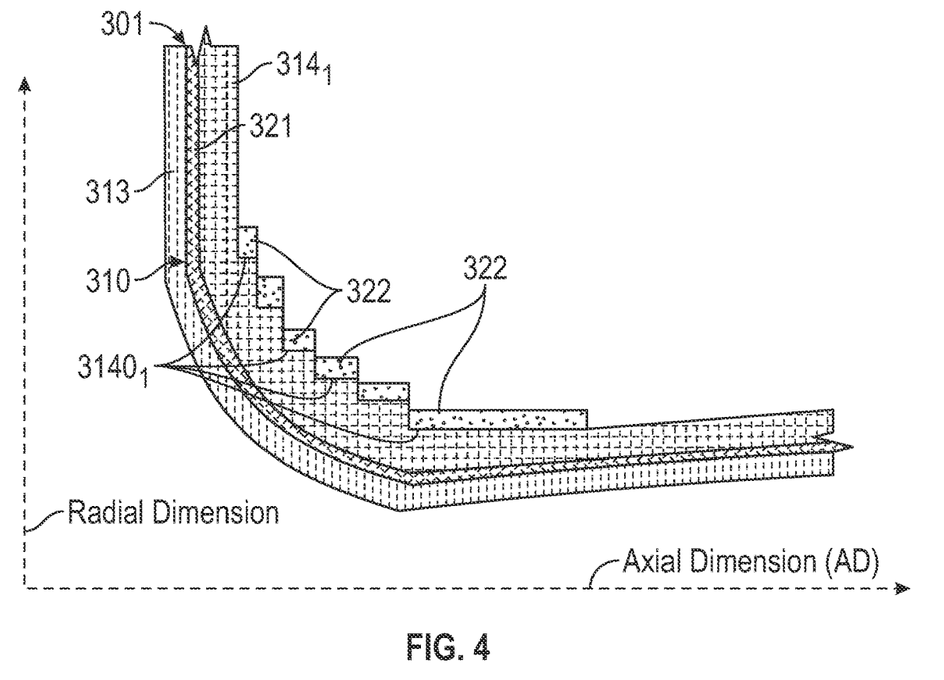
FIG. 4 is an axial cross-sectional view of the rotor assembly of FIGS. 3A and 3B(1-4) in accordance with embodiments.
Figure 5:
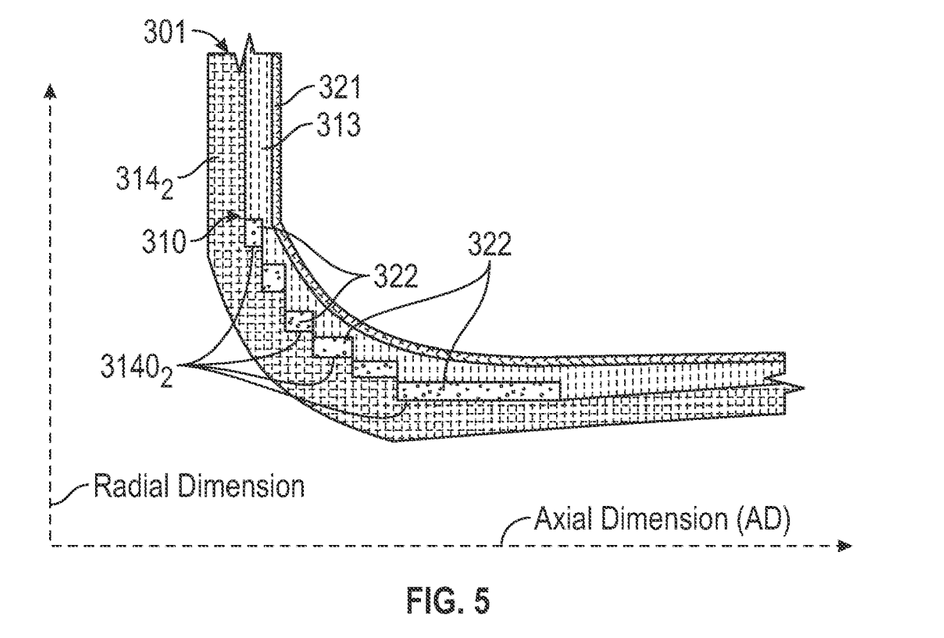
FIG. 5 is an axial cross-sectional view of the rotor assembly of FIGS. 3A and 3B(1-4) in accordance with embodiments.

With reference to FIGS. 3A, 3B1, 3B2, 3B3 and 3B4 and with reference to FIGS. 4 and 5, a rotor assembly 301 is provided in a similar manner as described above and includes a shroud 310 that is coaxial with and that partially surrounds a rotor 315. The shroud 310 includes a tubular section 311 and a flange section 312 as well as a transition section 313 axially interposed between the tubular section 311 and the flange section 312. The rotor assembly 301 further includes a fiber-reinforced polymer-matrix composite shroud 320. The fiber-reinforced polymer-matrix composite shroud 320 includes first fiber-reinforced polymer-matrix composite reinforcement elements 321 and second fiber-reinforced polymer-matrix composite reinforcement elements 322. The first fiber-reinforced polymer-matrix composite reinforcement elements 321 include reinforcing fibers extended along an axial dimension AD of the rotor 315 and are disposed to reinforce the transition section 313 against, at least, damages in the circumferential direction. The second fiber-reinforced polymer-matrix composite reinforcement elements 322 include reinforcing fibers extended along a circumferential dimension CD of the rotor 315 and are disposed to reinforce the transition section 313 against, at least, damages in the axial direction.

In accordance with embodiments, as shown in FIGS. 3B(1-4), the shroud 310 can include multiple parts including, but not limited to, an internal shroud and an external shroud that surrounds the internal shroud.

The shroud 310 can include one or more of metallic or alloy materials, polymers and reinforced polymers. The first fiber-reinforced polymer-matrix composite reinforcement elements 321 and the second fiber-reinforced polymer-matrix composite reinforcement elements 322 can include thermoset polymers or thermoplastic polymers, which can be reinforced by one or more of organic fibers, carbon fibers and glass fibers or any combinations thereof. Manufacturing of the rotor assembly 301 includes processing operations that are consistent with the various types of materials that can be used for the shroud 310 and the first fiber-reinforced polymer-matrix composite reinforcement elements 321 and the second fiber-reinforced polymer-matrix composite reinforcement elements 322.

In accordance with embodiments and as shown in FIG. 4, the first fiber-reinforced polymer-matrix composite reinforcement elements 321 can abut with an external surface of the transition section 313 and the shroud 310 includes an additional part $314_1$. In these or other cases, the additional part $314_1$ surrounds the transition section 313 and the first fiber-reinforced polymer-matrix composite reinforcement elements 321 and has an external surface that is formed to define treads $3140_1$ on which the second fiber-reinforced polymer-matrix composite reinforcement elements 322 can be seated.

In accordance with embodiments and as shown in FIG. 5, the first fiber-reinforced polymer-matrix composite reinforcement elements 321 can abut with an external surface of the transition section 313 and the shroud 310 includes an additional part $314_2$. In these or other cases, the transition section 313 and the first fiber-reinforced polymer-matrix composite reinforcement elements 321 surround the additional part $314_2$ and an external surface of the additional part $314_2$ and an internal surface of the transition section 313 are cooperatively formed to define treads $3140_2$ on which the second fiber-reinforced polymer-matrix composite reinforcement elements 322 can be seated.

Figure 6A:
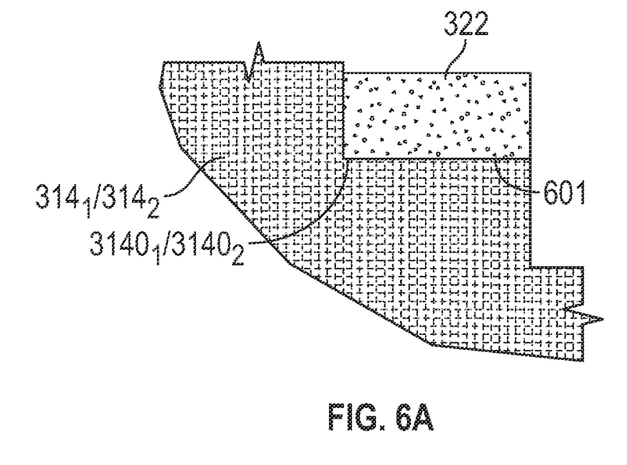
FIGS. 6A, 6B, 6C and 6D are partial axial cross-sectional schematic views of various configurations of treads of the rotor assembly of FIGS. 3A, 3B(1-4), 4 and 5 in accordance with embodiments.
Figure 6B:
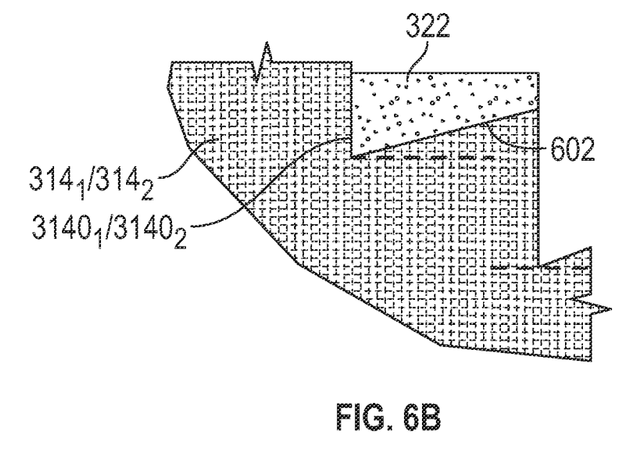
Figure 6C:
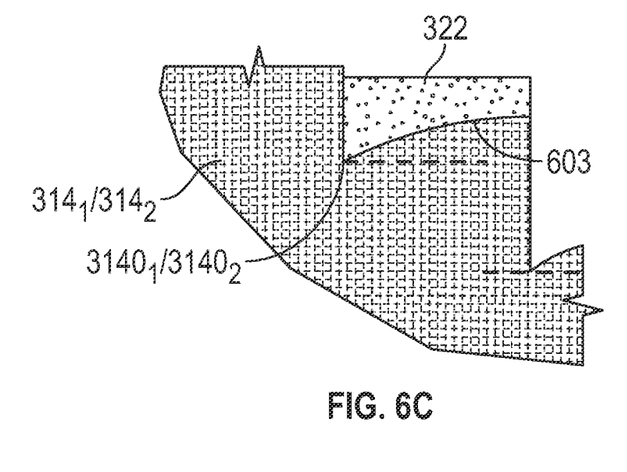
Figure 6D:
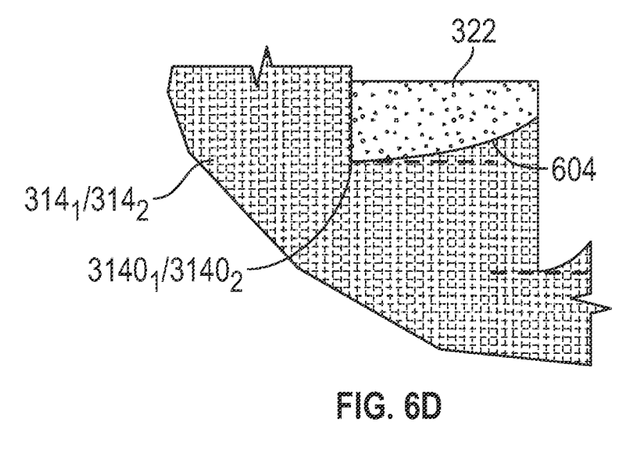

With reference to FIGS. 6A, 6B, 6C and 6D, the treads $3140_1$ of the additional part $314_1$ and the treads $3140_2$ of the additional part $314_2$ can have multiple configurations. For example, the treads $3140_1$ and the treads $3140_2$ can be formed as at least one of flat cylindrical steps 601 as shown in FIG. 6A, as linearly self-locking cylindrical steps 602 as shown in FIG. 6B, as convex self-locking cylindrical steps 603 as shown in FIG. 6C and as concave self-locking cylindrical steps 604 as shown in FIG. 6D. The flat steps 601 of FIG. 6A are characterized in that the second fiber-reinforced polymer-matrix composite reinforcement elements 322 can be easily slid onto and off the treads $3140_1$ and $3140_2$. The linearly self-locking cylindrical steps 602 of FIG. 6B, the convex self-locking cylindrical steps 603 of FIG. 6C and the concave self-locking cylindrical steps 604 of FIG. 6D are characterized in that they tend to urge the second fiber-reinforced polymer-matrix composite reinforcement elements 322 toward a retention position that holds the second fiber-reinforced polymer-matrix composite reinforcement elements 322 in place. In other embodiments, more complex shapes of self-locking treads can also be formed as a combination of any linear, convex or concave segments of the contact surface.

Figure 7A:
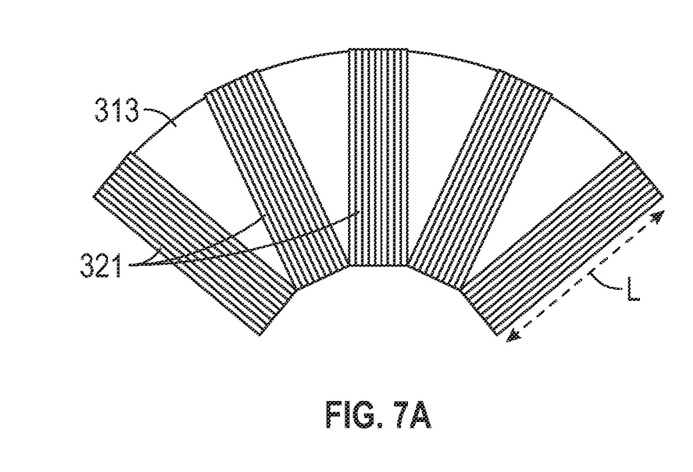
FIGS. 7A, 7B and 7C are partial diametric views illustrating various configurations of first composite reinforcement elements of the rotor assembly of FIGS. 3A, 3B(1-4), 4 and 5 in accordance with embodiments.
Figure 7B:
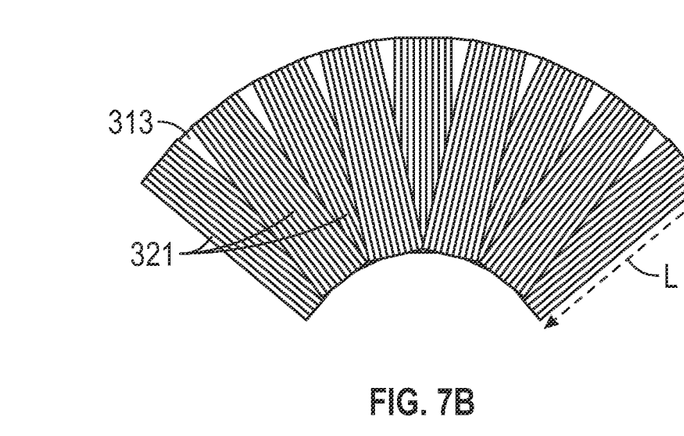
Figure 7C:
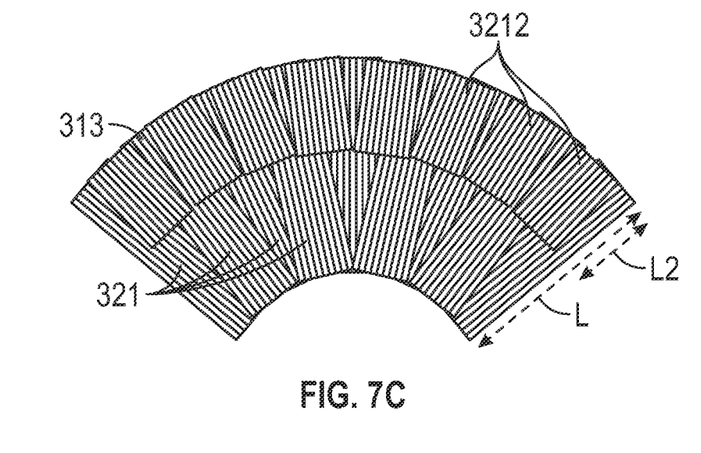

With reference to FIGS. 7A, 7B and 7C, the first fiber-reinforced polymer-matrix composite reinforcement elements 321 and orientation of their reinforcing fibers can be arranged in multiple formations. For example, the fibers of the first fiber-reinforced polymer-matrix composite reinforcement elements 321 can extend along a full axial length L of the transition section 313 and do not overlap with one another as shown in FIG. 7A. As another example, the fibers of the first composite reinforcement elements 321 can extend along the full axial length L of the transition section 313 and can at least partially overlap with one another as shown in FIG. 7B. As yet another example, the fibers of the first fiber-reinforced polymer-matrix composite reinforcement elements 321 can extend along the full axial length L of the transition section 313 and can overlap with one another and can also include fibers of the additional first fiber-reinforced polymer-matrix composite reinforcement elements 3212 that extend along a partial axial length L2 of the transition section 313 as shown in FIG. 7C.

Figure 8:
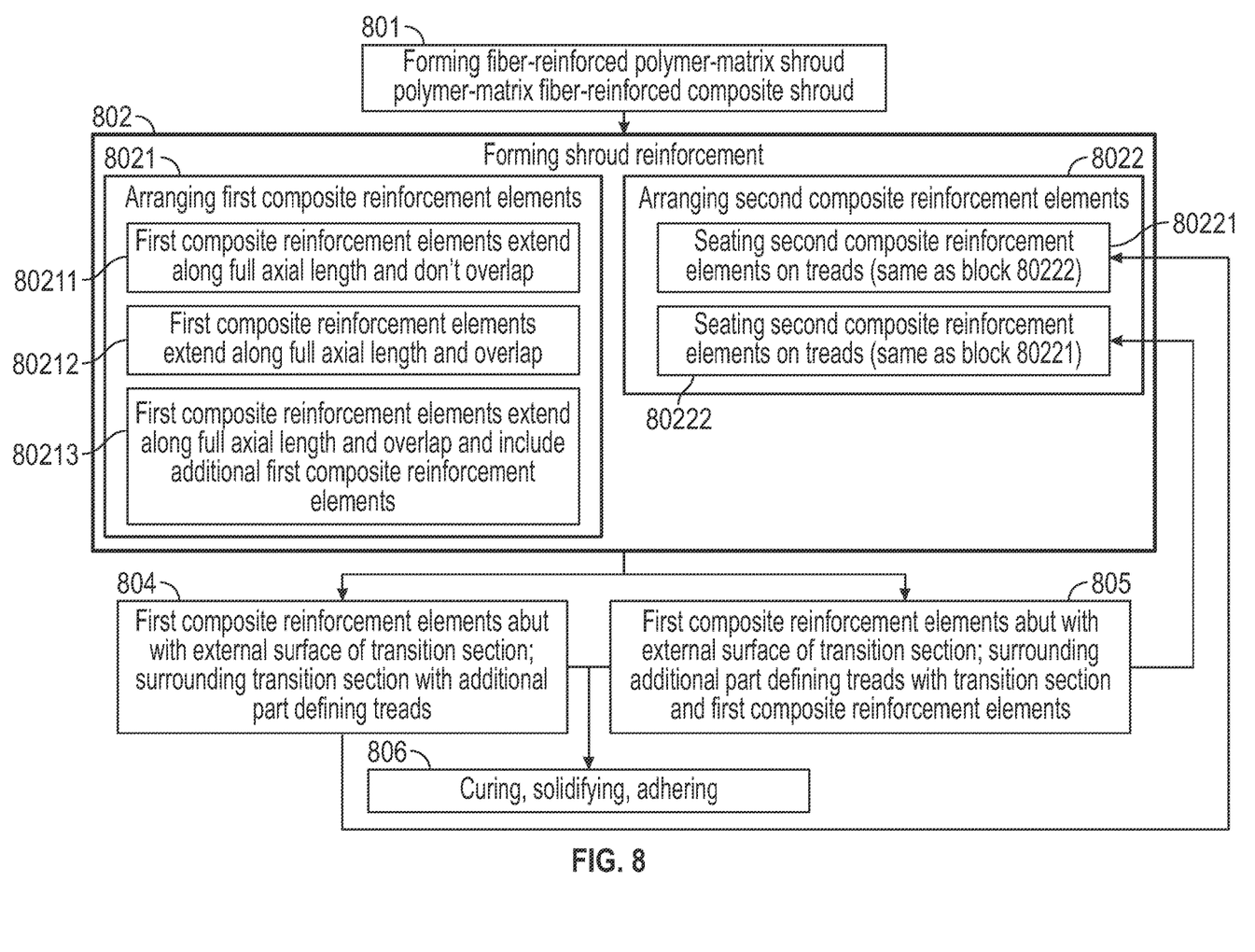
FIG. 8 is a flow diagram illustrating a method of assembling a shroud for a rotor assembly in accordance with embodiments.
Figure 9:
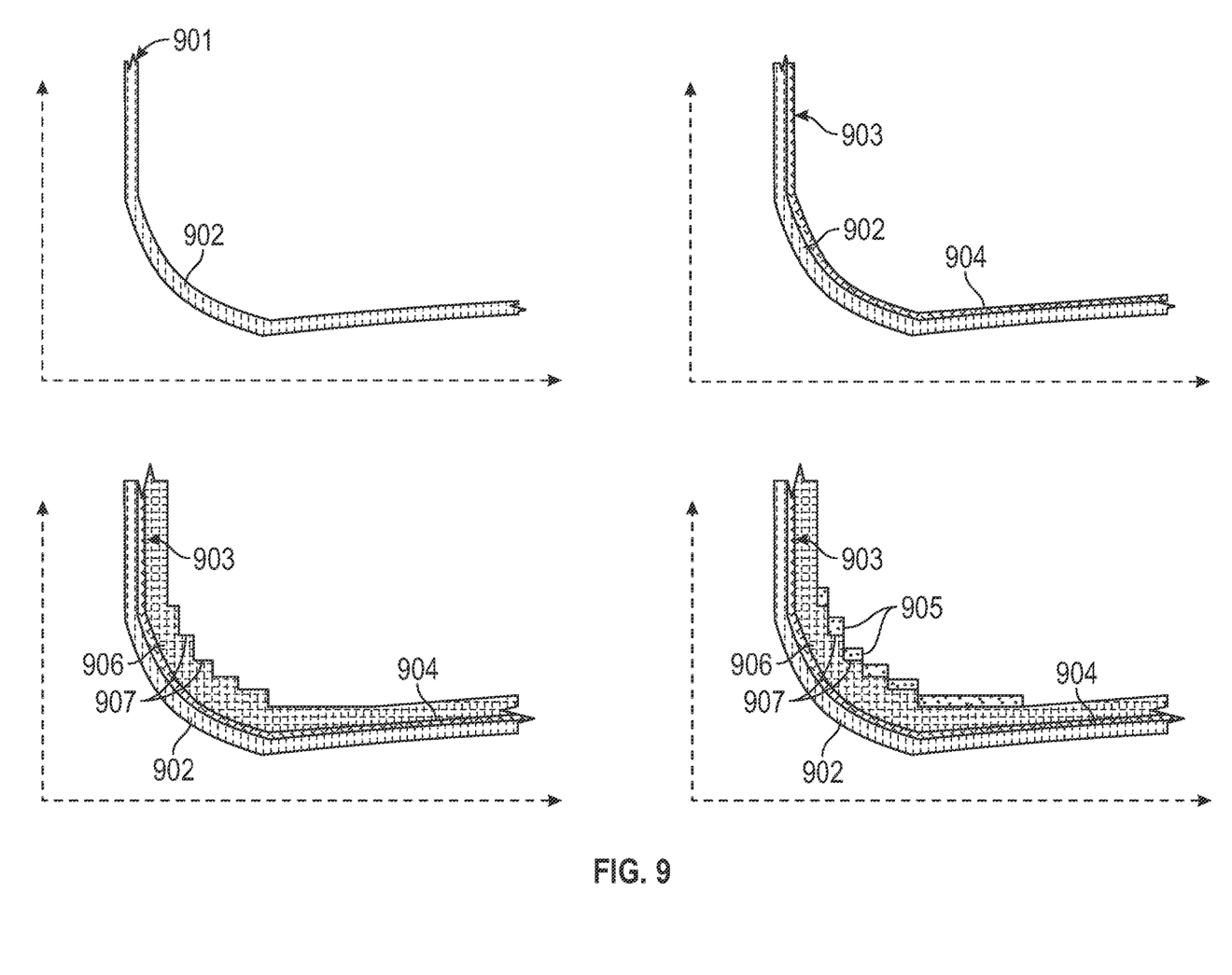
FIG. 9 includes graphical images illustrating the method of assembling the shroud for the rotor assembly of FIG. 8 in accordance with embodiments.

With reference to FIGS. 8 and 9, a method 800 of assembling a shroud for a rotor assembly, such as the shroud 310 of FIGS. 3A, 3B and 4, is provided. The method 800 includes forming a fiber-reinforced polymer-matrix composite shroud 901 to be coaxial with and partially surround a rotor and including tubular and flange sections and a transition section 902 that is axially interposed between the tubular and flange sections (block 801) and forming shroud reinforcement 903 (block 802). The forming of the shroud reinforcement 903 of block 802 includes arranging first fiber-reinforced polymer-matrix composite reinforcement elements 904 as described and defined above such that the fibers thereof extend along an axial dimension of the rotor and are disposed to reinforce the transition section 902 (block 8021) and arranging second fiber-reinforced polymer-matrix composite reinforcement elements 905 as described and defined above such that the fibers thereof extend along a circumferential dimension of the rotor and are disposed to reinforce the transition section 902 (block 8022).

The fiber-reinforced polymer-matrix composite shroud 901 can include one or more of metallic or alloy materials, polymers and reinforced polymers and the first fiber-reinforced polymer-matrix composite reinforcement elements 904 and the second fiber-reinforced polymer-matrix composite reinforcement elements 905 can include thermoset polymers or thermoplastic polymers, which can be reinforced by one or more of organic fibers, carbon fibers and glass fibers or any combinations thereof. As such, the method 800 further comprises one or more of curing in case of thermoset polymers, solidifying in case of thermoplastic polymers and adhering the first fiber-reinforced polymer-matrix composite reinforcement elements 904 and/or the second fiber-reinforced polymer-matrix composite reinforcement elements 905 (block 806).

In accordance with embodiments, the fiber-reinforced polymer-matrix composite shroud 901, the first fiber-reinforced polymer-matrix composite reinforcement elements 904 and the second fiber-reinforced polymer-matrix composite reinforcement elements 905 can be formed by various processes including for example, but not limited to, additive manufacturing (AM).

As noted above, the arranging of the first fiber-reinforced polymer-matrix composite reinforcement elements 904 of block 8021 can include at least one of arranging the first fiber-reinforced polymer-matrix composite reinforcement elements to extend along a full axial length of the transition section and not to overlap with one another (block 80211), arranging the first fiber-reinforced polymer-matrix composite reinforcement elements to extend along the full axial length of the transition section and to partially overlap with one another (block 80212) and arranging the first fiber-reinforced polymer-matrix composite reinforcement elements to extend along the full axial length of the transition section and to partially overlap with one another and to include additional first fiber-reinforced polymer-matrix composite reinforcement elements that extend along a partial axial length of the transition section (block 80213).

In accordance with embodiments, the arranging of the first fiber-reinforced polymer-matrix composite reinforcement elements 904 of block 8021 can be executed such that the first fiber-reinforced polymer-matrix composite reinforcement elements 904 abut with an external surface of the transition section 902. In these or other cases, the method 800 can further include surrounding the transition section 902 with an additional part 906 defining treads 907 (block 804) and the arranging of the second fiber-reinforced polymer-matrix composite reinforcement elements 905 of block 8022 can include seating the second fiber-reinforced polymer-matrix composite reinforcement elements 905 on the treads 907 (block 80221).

In accordance with embodiments, the arranging of the first fiber-reinforced polymer-matrix composite reinforcement elements 904 of block 8021 can include arranging the first fiber-reinforced polymer-matrix composite reinforcement elements 904 such that the first fiber-reinforced polymer-matrix composite reinforcement elements 904 abut with an external surface of the transition section 902 as shown in FIG. 5. In these or other cases, the method 800 can further include surrounding the additional part 906, which defines the treads 907, by the transition section 902 and the first fiber-reinforced polymer-matrix composite reinforcement elements 904 (block 805) and the arranging of the second fiber-reinforced polymer-matrix composite reinforcement elements 905 of block 8022 can include seating the second fiber-reinforced polymer-matrix composite reinforcement elements 905 on the treads 907 (block 80222).

In any case, as noted above, the treads 907 are at least one of flat cylindrical steps, linearly self-locking cylindrical steps, convex self-locking cylindrical steps and concave self-locking cylindrical steps as shown in FIGS. 6A, 6B, 6C and 6D or any combinations thereof.

Technical effects and benefits of the present disclosure are the provision of a composite shroud with reduced weight by substitution of metals with light-weight fiber-reinforced polymer-matrix composites. This provides for improved impact resistance due to efficient ballistic properties of organic fibers, such as Kevlar™ reduced cost of service/maintenance due to multiple factors, including, but not limited to, reduced risk of penetration.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A shroud reinforcement assembly, comprising:
   a shroud, which is formed of one or more of metallic and alloy materials, the shroud being coaxial with and partially surrounding a rotor and comprising tubular and flange sections and a transition section axially interposed between the tubular and flange sections; and
   a shroud reinforcement comprising:
   first fiber-reinforced polymer-matrix composite reinforcement elements with fibers extending along an axial dimension of the rotor and being disposed to reinforce the transition section; and
   second fiber-reinforced polymer-matrix composite reinforcement elements with fibers extending along a circumferential dimension of the rotor and being disposed to reinforce the transition section,
   wherein the first fiber-reinforced polymer-matrix composite reinforcement elements abut with an external surface of the transition section.

2. The shroud reinforcement assembly according to claim 1, wherein at least one of:
   the first fiber-reinforced polymer-matrix composite reinforcement elements extend along a full axial length of the transition section and do not overlap with one another,
   the first fiber-reinforced polymer-matrix composite reinforcement elements extend along the full axial length of the transition section and partially overlap with one another, and
   the first fiber-reinforced polymer-matrix composite reinforcement elements extend along the full axial length of the transition section and partially overlap with one another and comprise additional first fiber-reinforced polymer-matrix composite reinforcement elements that extend along a partial axial length of the transition section.

3. The shroud reinforcement assembly according to claim 1, wherein:
the shroud comprises an additional part surrounding the transition section and the first fiber-reinforced polymer-matrix composite reinforcement elements and defines treads on which the second fiber-reinforced polymer-matrix composite reinforcement elements are seated, and
the treads are at least one of flat cylindrical steps, linearly self-locking cylindrical steps, convex self-locking cylindrical steps and concave self-locking cylindrical steps.

4. The shroud reinforcement assembly according to claim 1, wherein:
the shroud comprises an additional part surrounded by the transition section and the first fiber-reinforced polymer-matrix composite reinforcement elements and defines treads on which the second fiber-reinforced polymer-matrix composite reinforcement elements are seated, and
the treads are at least one of flat cylindrical steps, linearly self-locking cylindrical steps, convex self-locking cylindrical steps and concave self-locking cylindrical steps.

5. The shroud reinforcement assembly according to claim 1, wherein the first and second composite reinforcement elements comprise thermoset polymers or thermoplastic polymers reinforced by one or more of organic fibers, carbon fibers and glass fibers.

6. A rotor assembly, comprising:
a shroud, which is formed of one or more of metallic and alloy materials, the shroud being coaxial with and partially surrounding a rotor and comprising tubular and flange sections and a transition section axially interposed between the tubular and flange sections; and
shroud reinforcement comprising:
first fiber-reinforced polymer-matrix composite reinforcement elements extending along an axial dimension of the rotor and being disposed to reinforce the transition section; and
second fiber-reinforced polymer-matrix composite reinforcement elements extending along a circumferential dimension of the rotor and being disposed to reinforce the transition section,
wherein the first fiber-reinforced polymer-matrix composite reinforcement elements extend along a full axial length of the transition section and do not overlap with one another.

7. The rotor assembly according to claim 6, wherein at least one of:
the first fiber-reinforced polymer-matrix composite reinforcement elements extend along a full axial length of the transition section and do not overlap with one another,
the first fiber-reinforced polymer-matrix composite reinforcement elements extend along the full axial length of the transition section and partially overlap with one another, and
the first fiber-reinforced polymer-matrix composite reinforcement elements extend along the full axial length of the transition section and partially overlap with one another and comprise additional first fiber-reinforced polymer-matrix composite reinforcement elements that extend along a partial axial length of the transition section.

8. The rotor assembly according to claim 6, wherein the shroud comprises an additional part surrounding the transition section and the first fiber-reinforced polymer-matrix composite reinforcement elements and defines treads on which the second fiber-reinforced polymer-matrix composite reinforcement elements are seated.

9. The rotor assembly according to claim 8, wherein the treads are at least one of flat cylindrical steps, linearly self-locking cylindrical steps, convex self-locking cylindrical steps and concave self-locking cylindrical steps.

10. The rotor assembly according to claim 6, wherein the shroud comprises an additional part surrounded by the transition section and the first fiber-reinforced polymer-matrix composite reinforcement elements and defines treads on which the second fiber-reinforced polymer-matrix composite reinforcement elements are seated.

11. The rotor assembly according to claim 10, wherein the treads are at least one of flat cylindrical steps, linearly self-locking cylindrical steps, convex self-locking cylindrical steps and concave self-locking cylindrical steps.

12. The rotor assembly according to claim 6, wherein the shroud comprises one or more of metallic or alloy materials, polymers and reinforced polymers.

13. The rotor assembly according to claim 6, wherein the first and second fiber-reinforced polymer-matrix composite reinforcement elements comprise thermoset polymers or thermoplastic polymers reinforced by one or more of organic fibers, carbon fibers and glass fibers.

14. A method of assembling a shroud for a rotor assembly, the method comprising:
forming a shroud, which is formed of one or more of metallic and alloy materials, to be coaxial with and partially surround a rotor and comprising tubular and flange sections and a transition section axially interposed between the tubular and flange sections; and
forming a shroud reinforcement,
the forming of the shroud reinforcement comprising:
arranging first fiber-reinforced polymer-matrix composite reinforcement elements to extend along an axial dimension of the rotor and to be disposed to reinforce the transition section; and
arranging second fiber-reinforced polymer-matrix composite reinforcement elements to extend along a circumferential dimension of the rotor and to be disposed to reinforce the transition section,
wherein the arranging of the first fiber-reinforced polymer-matrix composite reinforcement elements is executed such that the first fiber-reinforced polymer-matrix composite reinforcement elements abut with an external surface of the transition section.

15. The method according to claim 14, wherein:
the shroud comprises one or more of metallic or alloy materials, polymers and reinforced polymers,
the first and second composite reinforcement elements comprise thermoset polymers or thermoplastic polymers reinforced by one or more of organic fibers, carbon fibers and glass fibers, and
the method further comprises one or more of curing the thermoset polymers, solidifying the thermoplastic polymers and adhering the thermoset polymers or the thermoplastic polymers.

16. The method according to claim 14, wherein the arranging of the first fiber-reinforced polymer-matrix composite reinforcement elements comprises at least one of:

arranging the first fiber-reinforced polymer-matrix composite reinforcement elements to extend along a full axial length of the transition section and not to overlap with one another, arranging the first fiber-reinforced polymer-matrix composite reinforcement elements to extend along the full axial length of the transition section and to partially overlap with one another, and arranging the first fiber-reinforced polymer-matrix composite reinforcement elements to extend along the full axial length of the transition section and to partially overlap with one another and to comprise additional first fiber-reinforced polymer-matrix composite reinforcement elements that extend along a partial axial length of the transition section.

17. The method according to claim 14, wherein:

the method further comprises surrounding the transition section with an additional part defining treads, and the arranging of the second fiber-reinforced polymer-matrix composite reinforcement elements comprises seating the second fiber-reinforced polymer-matrix composite reinforcement elements on the treads.

18. The method according to claim 17, wherein the treads are at least one of flat cylindrical steps, linearly self-locking cylindrical steps, convex self-locking cylindrical steps and concave self-locking cylindrical steps.

19. The method according to claim 14, wherein:

the method further comprises surrounding an additional part by the transition section and the first fiber-reinforced polymer-matrix composite reinforcement elements, the additional part defining treads on which the second fiber-reinforced polymer-matrix composite reinforcement elements are seated.

20. The method according to claim 19, wherein the treads are at least one of flat cylindrical steps, linearly self-locking cylindrical steps, convex self-locking cylindrical steps and concave self-locking cylindrical steps.

* * * * *